United States Patent
Barthel et al.

(10) Patent No.: US 8,670,360 B2
(45) Date of Patent: Mar. 11, 2014

(54) METHOD AND SYSTEM FOR TRANSMITTING A SIGNAL COMPRISING PREAMBLE AND A DATA FRAME

(75) Inventors: Dominique Barthel, Bernin (FR); Abdelmalik Bachir, Grenoble (FR)

(73) Assignee: France Telecom, Paris (FR)

( * ) Notice: Subject to any disclaimer, the term of this patent is extended or adjusted under 35 U.S.C. 154(b) by 1459 days.

(21) Appl. No.: 11/992,183

(22) PCT Filed: Sep. 12, 2006

(86) PCT No.: PCT/FR2006/050877
§ 371 (c)(1),
(2), (4) Date: Oct. 31, 2008

(87) PCT Pub. No.: WO2007/031685
PCT Pub. Date: Mar. 22, 2007

(65) Prior Publication Data
US 2009/0122735 A1 May 14, 2009

(30) Foreign Application Priority Data

Sep. 13, 2005 (FR) .................................... 05 09312

(51) Int. Cl.
*G08C 17/00* (2006.01)
*H04B 7/00* (2006.01)
(52) U.S. Cl.
USPC .......................................... 370/311; 370/310

(58) Field of Classification Search
USPC ........................................ 370/331, 311, 310
See application file for complete search history.

(56) References Cited

U.S. PATENT DOCUMENTS

| | | | |
|---|---|---|---|
| 6,119,228 A * | 9/2000 | Angelo et al. | 713/180 |
| 2004/0023651 A1 * | 2/2004 | Gollnick et al. | 455/423 |
| 2005/0117530 A1 | 6/2005 | Abraham et al. | |
| 2006/0251081 A1 * | 11/2006 | Choksi | 370/394 |
| 2007/0183457 A1 * | 8/2007 | Leitch | 370/498 |
| 2009/0216100 A1 * | 8/2009 | Ebner et al. | 600/347 |

FOREIGN PATENT DOCUMENTS

| | | |
|---|---|---|
| JP | 2000 270041 | 9/2000 |
| JP | 2005 176165 | 6/2005 |

OTHER PUBLICATIONS

El-Hoiydi et al., "Poster Abstract: WiseMac, an Ultra Low Power MAC Protocol for the WiseNET Wireless Sensor Network", Internet Article, Nov. 5, 2003, http://www.cens.ucla.edu/sensys03/proceedings/p302-elhoiydi.pdf>.

* cited by examiner

*Primary Examiner* — Shripal Khajuria
(74) *Attorney, Agent, or Firm* — Knobbe Martens Olson & Bear LLP

(57) ABSTRACT

A system, a device, and a method for transmitting a signal (11) comprising a preamble and a data frame (13) by preamble sampling in a communications network including a plurality of nodes (1a, 1b), said preamble including a numbered sequence of microframes (19).

11 Claims, 2 Drawing Sheets

METHOD AND SYSTEM FOR TRANSMITTING A SIGNAL COMPRISING PREAMBLE AND A DATA FRAME

RELATED APPLICATIONS

This is a U.S. National Phase Application under 35 USC 371 of International Application PCT/FR2006/050877, filed on Sep. 12, 2006.

This application claims the priority of French application no. 05/09312 filed Sep. 13, 2005 the entire content of which is hereby incorporated by reference.

FIELD OF THE INVENTION

The invention relates to transmitting a signal comprising a preamble and a data frame by preamble sampling in a communications network, more particularly in a wireless network using the radio medium.

BACKGROUND OF THE INVENTION

To transmit a signal on a channel of a communications network, the protocols for access to a standard medium (for example a medium conforming to the IEEE 802.11 DCF standard), require that a radio transceiver is switched on at all times and always ready to receive the signal. This "ready to receive" mode consumes a lot of energy. If there is no transmission on the channel that energy is wasted in passive listening. This problem is clearly apparent in ad hoc low-traffic sensor networks, in which the channel is unoccupied most of the time.

To solve this problem there are preamble sampling transmission methods that reduce the passive listening overhead.

FIG. 8 shows diagrammatically the variation over time 125 in the transmission between a sender node 101a and a receiver node 101b of a signal 111 comprising a preamble 115 and a data frame 113. The preamble sampling protocol entails for a node listening to the radio channel intermittently.

The time axis 125 of the receiver node 101b is divided into brief periods represented by small squares 129 during which the radio is switched on (i.e. during which the receiver node 101b is active). These brief listening periods 129 are spaced by long periods 127 during which the radio is switched off (i.e. during which the receiver node 101b is inactive). The time axis 125 of the sender node 101a shows the sending of the signal 111 comprising the data frame 113 preceded by the preamble 115.

Accordingly, in protocols of this kind, a node has its radio switched off most of the time in order to reduce passive listening and therefore save energy.

Generally speaking, the node must periodically verify whether there is a signal (or a message) intended for it, for example once every $T_w$ seconds (period 127). For this purpose, the node is activated during a short period 129 to listen to the channel.

If the node finds that the channel is free, it is deactivated again (its radio is switched off). In contrast, if it detects the presence of a preamble (known bit pattern) on the channel, it remains active (period 117) to receive the data frame 113 that follows the preamble 115. After receiving the data frame 113 the node is deactivated again. The preamble 115 is a long frame that contains repeating known bit patterns. This enables an active node to recognize a pattern and therefore to tell that it is a preamble 115.

Moreover, when a node wishes to send a data frame it listens to the channel first. If it finds that the channel is busy, it continues to listen until the channel is released. In contrast, if it finds that the channel is free, it sends a preamble before sending a data frame. To ensure that all potential receiver nodes are active during sending of the preamble, so that they do not miss the data that follows the preamble, the duration of the preamble must be at least equal to $T_w$.

A known method of reducing the size of the preamble is proposed by Enz C C., El-Hoiydi A., Decotignie J., and Peiris V. in their paper "WiseNET: An Ultra Low-Power Wireless Sensor Network Solution" (IEEE Computer, 37(8): 62-70, August 2004). That document describes an algorithm which uses small size preamble sampling to reduce the cost of point-to-point (unicast) messages. That reduces the transmission and reception time and therefore saves energy.

However, that method does not reduce the cost of multi-point (broadcast) communication, where listening to the preamble is of no utility.

Moreover, when a node wishes to send and finds the channel busy, it continues to listen until the channel is released, in order to send its frame. The node cannot tell when the channel will next be released. Such unnecessary listening consumes energy.

Moreover, in that method, a node can receive redundant data frames because it has no means for verifying whether it has already received the same data frames, and thus a lot of energy is wasted to no purpose.

OBJECT AND SUMMARY OF THE INVENTION

One object of the invention is to optimize the consumption of energy by the nodes of a communications network, in particular an ad hoc network.

This and other objects are attained in accordance with one aspect of the invention directed to a method of transmitting a signal comprising a preamble and a data frame in a communications network including a plurality of nodes. The method comprises:

generating a signal whose preamble includes a numbered sequence of microframes, the numbering of the microframes of said sequence being such that the number of any of the microframes makes it possible to deduce the remaining number of microframes in the sequence before the data frame; and sending the signal via the network.

On receiving a microframe, a node recognizes that it is a preamble. From the sequence number contained in the received microframe, the receiver node can determine the remaining number of microframes in the sequence before the data frame, and consequently the arrival time of the data frame (i.e. the time remaining before the arrival of the data frame following reception of the microframe concerned).

The time between the first and last microframes of said sequence of microframes is greater than or equal to a particular period corresponding to a time of deactivation of a node between two successive reactivations.

It is therefore always certain that the node can receive at least one microframe.

In a first particular embodiment of the invention, on reception of a microframe by a node, said node reads the sequence number of the received microframe, deduces the time of arrival of the data frame, and is deactivated in the meantime. The receiver node can therefore be deactivated after it has received the microframe and until the data frame arrives. This greatly reduces the consumption of energy caused by unnecessary listening while also guaranteeing reception of the data frame.

This saves energy and reduces the cost of receiving a data frame in multipoint (broadcast) or point-to-point (unicast) mode.

In a second particular implementation of the invention, in order to access a channel of the communications network:

a) a node is reactivated to listen to the channel;

b) if the node receives a microframe indicating that the channel is occupied by another node, the said node:

reads the sequence number of the microframe to deduce the time for which said channel will be busy; and is deactivated and reactivated in order to access said channel only after the end of that time.

This saves energy by reducing the unnecessary listening time for accessing the channel if another node has busied the channel.

For microframes including a signature of the data frame, when a node receives a microframe, said node advantageously reads the signature of the data frame in order to verify whether it has already received that data frame.

This further reduces the cost of unnecessary listening to redundant frames, further saving energy.

This signature can be obtained by applying a hashing function to the data frame. This creates imprints of fixed small size from data frames of variable size.

A microframe advantageously includes a destination address. This enables a node to recognize immediately if the data frame is intended for another node, further reducing the cost of unnecessary listening to frames.

The invention also consists in a device for sending a signal comprising a preamble and a data frame in a communications network, the device being characterized in that it includes generator means adapted to generate a signal whose preamble includes a numbered sequence of microframes, the numbering of the microframes of said sequence being such that the number of any of the microframes makes it possible to deduce the remaining number of microframes in the sequence before the data frame.

Another aspect of the invention is directed to a device for receiving a signal sent via a communications network, said signal comprising a preamble including a numbered sequence of microframes and a data frame, the numbering of the microframes of said sequence being such that the number of any of the microframes makes it possible to deduce the remaining number of microframes in the sequence before the data frame. The device includes control means adapted on reception of a microframe of a signal to read the sequence number of the received microframe, to determine from the read sequence number the time of arrival of the data frame of the signal, and to command deactivation of the receiver device following reception of the microframe and then its reactivation in order to receive said data frame.

Another aspect of the invention is directed to a system for transmitting data frames including at least a sender node and a receiver node, the system being characterized in that the sender node includes a sender device as defined above and the receiver node includes a receiver device as defined above.

Another aspect of the invention is directed to a signal comprising a preamble and a data frame, the signal being characterized in that the preamble includes a numbered sequence of microframes, the numbering of the microframes of said sequence being such that the number of any of the microframes makes it possible to deduce the remaining number of microframes in the sequence before the data frame. A microframe can further include:

a signature of the data frame and/or a destination address.

BRIEF DESCRIPTION OF THE DRAWINGS

Other features and advantages of the invention emerge on reading the description given below by way of non-limiting example and with reference to the appended drawings, in which.

DETAILED DESCRIPTION OF EMBODIMENT

Figure 1:
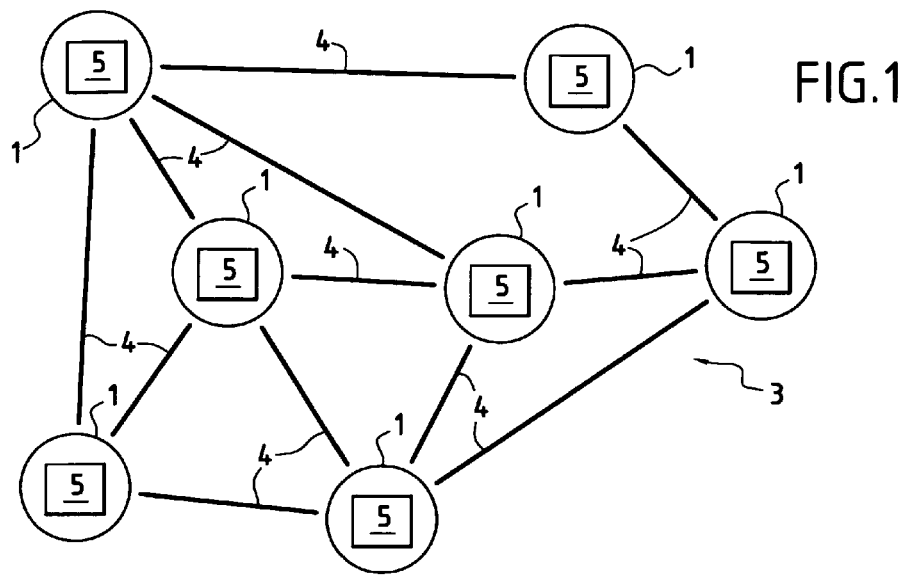
FIG. 1 is a diagram of a transmission system including a plurality of nodes in a communications network of the invention.

FIG. 1 shows an example of a transmission system including a plurality of nodes 1 in a communications network 3 according to the invention. The network 3 can be an extensive network or a wireless local area network using the radio medium. Each node 1 of the network 3 corresponds to an entity that can be a mobile entity and that can set up a call with its neighbor nodes 1 via a radio channel 4. The node 1 can function as a client, a server, or a router.

For example, the network 3 is an ad hoc network and more particularly a network of sensors in which the nodes 1 include low energy consumption sensors, for example temperature, pressure, airspeed, or vibration sensors or probes to warn of natural disasters. Another example is a ubiquitous computing network.

In the particular example described, each node 1 includes a device 5 for sending and receiving signals, each comprising a preamble and a data frame as explained below. The device 5 includes a radio transceiver. It can be a sensor, a computer, a mobile telephone, or any other device that can receive and/or send a signal.

Figure 2:
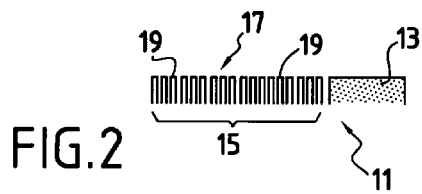
FIG. 2 is a diagram of a signal comprising a data frame preceded by a preamble that includes a sequence of microframes of the invention.

FIG. 2 is a diagram showing a signal 11 of the invention and comprising a data frame 13 preceded by a preamble 15 that includes a sequence 17 of microframes 19. That sequence 17 of microframes can be recognized by a node 1 as being a preamble 15 and, moreover, can include useful information enabling the node 1 to reduce the cost of unnecessary listening.

Figure 7:
FIG. 7 is a diagram of a microframe structure including a plurality of fields of the invention.

The sequence 17 of microframes 19 is numbered, i.e. each microframe 19 has a sequence number, corresponding to the reference 45 in FIG. 7, from which it is possible to deduce the remaining number of microframes 19 before the data frame 13. In other words, the microframes of the sequence are numbered so that the number of any of the microframes makes it possible to deduce the remaining number of microframes in the sequence before the data frame. A microframe 19 can additionally include specification or type data 41 (FIG. 7) indicating that it is a microframe 19.

The microframes 19 can be numbered sequentially from 1 to m, for example. The number m designates the number of microframes required for the duration $T_w$ of the preamble 15 to be at least equal to the period between activations of a receiver node. Accordingly, the duration $T_w$ of the preamble contains m microframes each having a duration f and inter-microframe intervals each having a duration s.

The duration $T_w$ of the preamble can then be expressed as a function of m, s, and f according to the following formula:

$$T_w = (s+f) \cdot m$$

Figure 4:
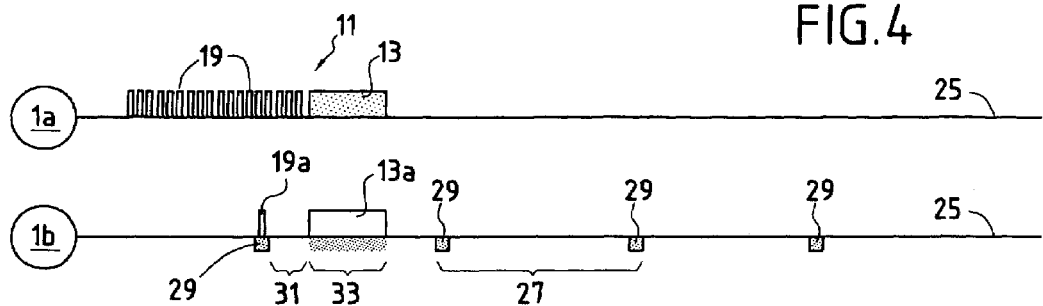
FIGS. 4 to 6 are diagrams of the variation over time in a number of modes of transmitting a signal between two nodes.

In other words, the time between a first microframe 19 and a final microframe 19 of the sequence 17 of microframes is equal to the particular period $T_w$ corresponding to a duration greater than or equal to a period 27 of the deactivation of a node 1 between two consecutive reactivations 29 (see FIG. 4 for example).

Figure 3:
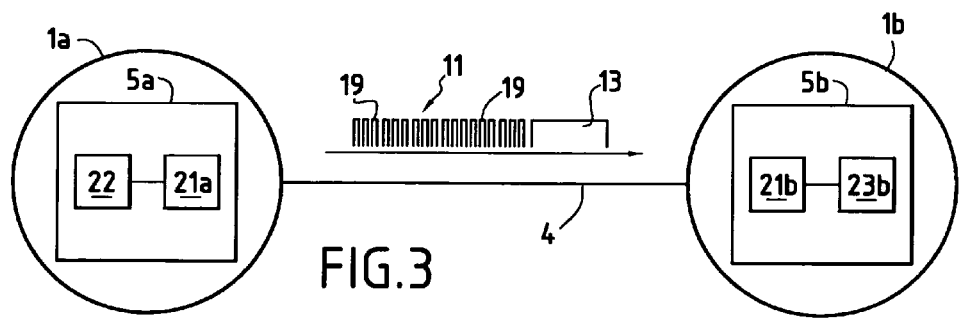
FIG. 3 is a diagram of transmission of the signal shown in FIG. 2 between two nodes.

FIG. 3 shows functional block diagrams of the node 1a and the node 1b, which are respectively the sender node and the receiver node in the particular example described here. For clarity, FIG. 3 shows only the elements of the sender portion of the send/receive device 5a of the node 1a and the elements of the receiver portion of the send/receive device 5b of the node 1b. Note, however, that here the nodes 1a and 1b can function both as sender and as receiver and therefore that each can comprise a sender portion and a receiver portion.

Referring to FIG. 3, the sender portion of the send/receive device 5a of the sender node 1a includes generator means 22 and sender means 21a. The generator means 22 are adapted to generate a signal 11 as previously described, including a preamble 15 followed by a data frame 13. The preamble 15 comprises in particular a numbered sequence 17 of microframes, the numbering of the microframes being such that the number of any of the microframes makes it possible to deduce the remaining number of microframes in the sequence before the data frame. The sender means 21a are adapted to send this signal 11 to the receiver node 1b via the communications network 3.

The sending of the signal 11 by the sender node 1a can be simultaneous sending of the general broadcast type to a very large number of (intended recipient) nodes.

Referring to FIG. 3, the receiver portion of the send/receive device 5b of the node 1b includes receiver means 21b and control means 23b for the receiver means 21b. The receiver means 21b are adapted to receive a signal 11 conforming to that sent by the sender node 1a. The control means 23b are adapted to control deactivation and reactivation of the receiver means 21b according to a sequence number contained in a microframe 19 received by the receiver means 21b, as described later. The control means 23b are therefore adapted, on reception of a microframe 19 of a signal 11, to execute those steps of the method described later that are executed by the receiver node 1b, in particular:

reading the sequence number 45 of the received microframe 19;

determining from the read sequence number the time of arrival of the data frame 13 of the signal 11; and commanding deactivation of the node 1b, to be more precise of its send/receive device 5b, following reception of the microframe 19, and then its reactivation so as to receive the data frame 13.

The control means 23b can consist of a microprocessor, microcontroller, or other programmable component. The programmable component executes a computer program including instructions necessary for executing the method of the invention for transmitting data frames by sampling the preamble.

Computer programs can be executed in the nodes 1 of the transmission system 3 to execute the method of the invention for transmitting data frames by sampling the preamble. Accordingly, the invention also provides:

a computer program for a device for sending a signal comprising a preamble and a data frame, the program including program instructions for commanding the generation of a signal whose preamble includes a numbered sequence of microframes, the numbering of the microframes of said sequence being such that the number of any of the microframes makes it possible to deduce the remaining number of microframes in the sequence before the data frame when the program is executed by the sender device; and a computer program for a device for receiving a signal as described above, including program instructions for commanding, on reception of a microframe of the signal, reading the sequence number of the received microframe, determining the time of arrival of the data frame of the signal, and deactivating the receiver device following reception of the microframe and then its reactivation in order to receive said data frame.

These programs can be stored in or transmitted by data media, which can be hardware storage media, for example a CD-ROM, a magnetic diskette or a hard disk, or transmissible media such as an electrical, optical or radio signal.

FIG. 3 is a diagram showing transmission of a signal 11 between the nodes 1a and 1b of the communications network 3. At the sending end, the sender node 1a generates a signal 11 as described above. In particular, the signal 11 includes a preamble that comprises a numbered sequence of microframes 19 and is followed by a data frame 13. The numbering of the microframes 19 of the sequence 11 that precedes the data frame 13 is such that the number of any of the microframes makes it possible to deduce the remaining number of microframes in the sequence before the data frame 13. The sender node 1a sends the generated signal 11 to the node 1b via the network 3.

FIG. 4 is a diagram showing the variation over time 25 in the transmission of this signal 11 between the sender node 1a and the receiver node 1b. The receiver node 1b verifies whether there is a message that is intended for it periodically, for example every $T_P$ seconds (period 27 with $T_P$ greater than or equal to $T_w$). For this, the receiver node 1b is reactivated for a short period 29 to listen to the channel 4. It receives the microframe 19a during one of these reactivation periods 29, as shown in FIG. 4.

Figure 8:
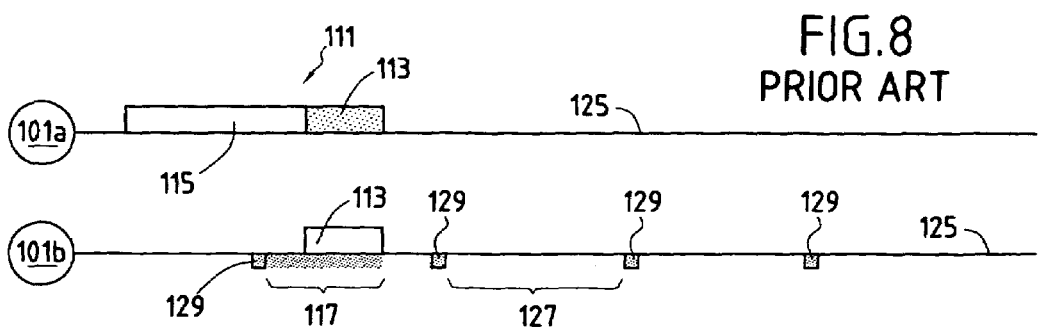
FIG. 8 is a diagram of the variation over time in the transmission of a signal between two nodes in accordance with the prior art.

The receiver node 1b reads the sequence number in the microframe 19a and deduces from it the remaining number of microframes in the sequence before the data frame 13 and then the corresponding duration of the period 31 in FIG. 4. When the receiver means 21b of the receiver node 1b receive the microframe 19a, the control means 23b read the sequence number of the microframe 19a and deduce the remaining number of microframes in the sequence before the arrival of the data frame 13 and then the time of arrival of the data frame 13a, in other words the duration of the period 31 in FIG. 4. The control means 23b can then command the receiver means 21b to switch off the radio until the time of arrival of the data frame 13, i.e. during the period 31. This example shows that the receiver node 1b can be switched off during the period 31, that is between reception of the microframe 19a and reception of the data frame 13. The node 1b is then reactivated only during the period 33 in which it receives the data frame 13, which is short by comparison with the period 117 (see FIG. 8 showing the prior art).

To calculate the energy saving of the microframe sampling method of the invention compared to a standard preamble sampling method, the average listening time MT according to the invention is compared with the standard average listening time EP for receiving a data frame of duration T.

The energy saving is then given by the following formula:

$$\text{Saving} = 1 - MT/EP = 1 - \frac{(s+f)/2 + f + T}{m(s+f)/2 + T}$$

Given that the number m of microframes is very high compared to the durations f (microframe period) and s (period between two consecutive microframes), the above formula indicates a saving in the cost of receiving data, as applies in particular for general broadcasting.

Figure 5:
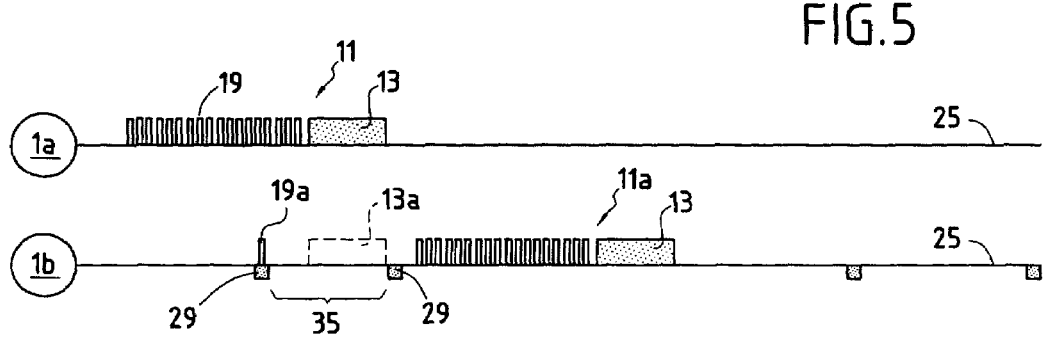

FIG. 5 is another example of the variation over time 25 in the transmission of a signal 11 between the node 1*a* and the node 1*b* in a carrier sense multiple access (CSMA) mode. This access mode enables a single channel 4 to be shared between a number of nodes 1. Accordingly, before sending, each node 1 must listen to the channel 4 to find out whether it is free or not. If the channel is free then the node 1 can send, or if not, the node 1 must continue to listen until the channel 4 is released so that it can send. The aim of this method is to prevent collisions caused by simultaneous access to the channel 4. Remember that the device 5*b* of the node 1*b* includes both receiver means and sender means.

This example shows that using microframes 19 reduces the otherwise unnecessary listening time needed to access the channel 4 if another node 1 that wishes to send data finds it to be busy.

When a node 1*b* is reactivated, its send/receive device 5*b* listens to the channel 4. If the receiver means 21*b* receive a microframe 19*a*, then the control means 23*b* deduce that the channel 4 is busy by virtue of its use by another send/receive device 5*b*, and read the sequence number of the microframe 19*a* in order to determine the time 35 for which the channel will be busy to enable the send/receive device 5*b* to be deactivated and then reactivated in order to access said channel 4 only after this time 35. In other words, this enables the node 1*b* to switch off its radio for the time 35 during which the channel 4 is going to be busy and to be reactivated only after the end of that time, in order to attempt access to the channel 4 again in order to send the signal 11.

Assuming each node has n neighbors that can detect and decode the signal 11, the energy saving is then given by the following formula:

$$\text{Saving} = 1 - MT/EP = 1 - \frac{n(s+f)/2 + nf + (n-1)T}{n \cdot m \cdot (s+f)/2 + n \cdot T}$$

This formula shows that the saving depends on the duration T of the data frame 13. The longer the duration T, the greater the saving.

Figure 6:
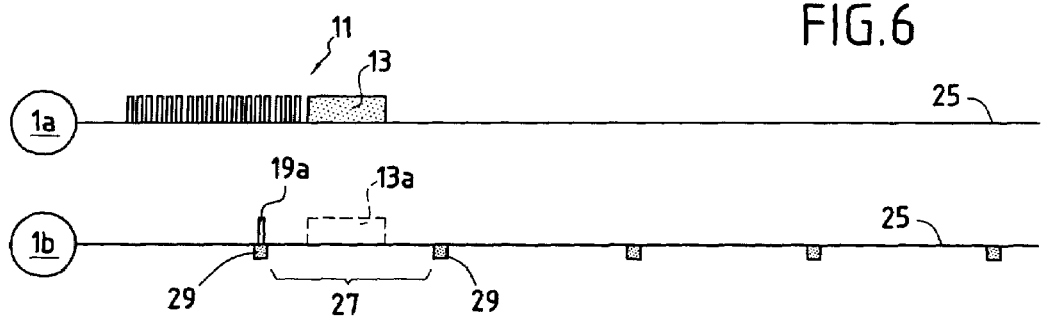

FIG. 6 is another example of the variation over time 25 in the transmission of a signal 11 between the sender node 1*a* and the receiver node 1*b*.

In this example, the microframes 19 can be used to enable a node 1*b* to filter the data frames 13 before receiving them.

A microframe 19 can include a signature 47 (see FIG. 7) of the data frame 13. The signature can be obtained by applying a hashing function to the data frame 13 adapted to transform that data frame 13, that can be of variable size, into a code of fixed size.

The control means 23*b* can then control deactivation and reactivation of the send/receive device 5*b* depending on the signature of the data frame 13 included in the received micro frame 19*a*.

The signature of the data frame 13 enables a node 1*b* to avoid receiving redundant and therefore useless frames. If its send/receive device 5*b* receives a microframe 19*a* when a node 1*b* is reactivated to listen to the channel 4, then the control means 23*b* read the signature of the data frame 13 in order to verify whether the node 1*b* has already received that data frame 13. For example, the control means 23*b* can compare this signature with the signatures already received, and if it finds this signature among those already received it can then deduce that the node 1*b* has already received the next data frame 13 and can therefore be deactivated during the period 27.

The energy saving is then given by the following formula:

$$\text{Saving} = 1 - MT/EP = 1 - \frac{n(s+f)/2 + nf + (n-1)T}{n \cdot m \cdot (s+f)/2 + n \cdot T}$$

Note that the saving is the same in the above two formulas because in both situations receiving the same quantity of microframes 19 and data frames 13 is avoided.

A microframe 19 can advantageously also include a field for a destination address 43 (see FIG. 7). The control means 23*b* can then also control deactivation and reactivation of the send/receive device 5*b* according to the destination address contained in the received microframe 19*a*.

This enables a node 1 to recognize immediately if the data frame 13 is intended for another node, thus further reducing the cost of unnecessary listening to frames.

FIG. 7 shows one particular structure of a microframe 19 including four fields. The first field is a type field 41 indicating that the frame is a microframe 19, the second field is an address field 43 indicating the destination address of the data frame 13 that follows the sequence of microframes 19, the third field is a number field 45 indicating the sequence number of the microframe 19, and the fourth field is a signature field 47 indicating the signature of the data frame 13. Note further that the microframe 19 can include one or more of the fields 41 to 47.

Accordingly, as well as preventing passive listening and collisions, the signal 11 of the invention prevents unnecessary listening (overhearing) by preventing reception and decoding of a data frame intended for another node, a redundant data frame whose content is of no interest for routing or to the application, since it has already been received, or data frames occupying the channel pending its release.

The invention claimed is:

1. A method of transmitting a signal comprising a preamble and a data frame in a communications network including a plurality of nodes, each node comprising a device for sending and receiving signals which is deactivated and reactivated alternately, a time between two consecutive reactivations of the device corresponding to a predetermined deactivation period, wherein the method comprises the steps of:
    generating a signal with a preamble that includes a numbered sequence of microframes, the numbering of the microframes of said sequence being such that the number of any of the microframes makes it possible to deduce the remaining number of microframes in the sequence before the data frame; and
    sending the signal via the network,
    wherein a time between a first microframe of said sequence of microframes and a final microframe thereof is greater than or equal to said predetermined deactivation period.

2. The method according to claim 1, wherein, on reception of a microframe by a node, said node reads the sequence number of the received microframe, deduces the time of arrival of the data frame, and is deactivated in the meantime.

3. The method according to claim 1,
wherein a node is reactivated to listen to the channel; and
wherein if the node receives a microframe indicating that the channel is occupied by another node, the said node:
reads the sequence number of the microframe to deduce the time for which said channel will be busy, and
is deactivated and reactivated in order to access said channel only after the end of that time.

4. The method according to claim 1, wherein the microframes including a signature of the data frame, on reception of a microframe by a node, said node reads the signature of the data frame in order to verify whether it has already received that data frame.

5. A signal-generating device for sending a signal comprising a preamble and a data frame in a communications network including a plurality of nodes, each node comprising a device for sending and receiving signals which is deactivated and reactivated alternately, a time between two consecutive reactivations of the device for sending and receiving signals corresponding to a predetermined deactivation period, the signal-generating device comprising:
a generator which generates a signal with a preamble that includes a numbered sequence of microframes, the numbering of the microframes of said sequence being such that the number of any of the microframes makes it possible to deduce the remaining number of microframes in the sequence before the data frame,
wherein a time between a first microframe of said sequence of microframes and a final microframe thereof is greater than or equal to said predetermined deactivation period.

6. A computer program stored on a computer memory and executing on a processor of a signal-generating device, which causes the processor to execute steps for sending a signal comprising a preamble and a data frame in a communications network including a plurality of nodes, each node comprising a device for sending and receiving signals which is deactivated and reactivated alternately, a time between two consecutive reactivations of the device for sending and receiving signals corresponding to a predetermined deactivation period, the computer program comprising program instructions for:
generating a signal with a preamble that includes a numbered sequence of microframes, the numbering of the microframes of said sequence being such that the number of any of the microframes makes it possible to deduce the remaining number of microframes in the sequence before the data frame when the program is executed by the signal-generating device,
wherein a time between a first microframe of said sequence of microframes and a final microframe thereof is greater than or equal to said predetermined deactivation period.

7. A non-transitory computer-readable medium including the program according to claim 6 stored thereon.

8. A device for receiving a signal sent via a communications network, said signal comprising a preamble including a numbered sequence of microframes and a data frame, the device being deactivated and reactivated alternately, a time between two consecutive reactivations of the device corresponding to a predetermined deactivation period, the numbering of the microframes of said sequence being such that the number of any of the microframes makes it possible to deduce the remaining number of microframes in the sequence before the data frame, comprising:
a controller which, on reception of a microframe of a signal, reads the sequence number of the received microframe, determines from the read sequence number the time of arrival of the data frame of the signal, and commands deactivation of the device following reception of the microframe and then its reactivation in order to receive said data frame,
wherein a time between a first microframe of said sequence of microframes and a final microframe thereof is greater than or equal to said predetermined deactivation period.

9. A computer program stored on a computer memory and executing on a processor of a device, which causes the processor to execute steps for receiving a signal sent via a communications network, the device being deactivated and reactivated alternately, a time between two consecutive reactivations of the device corresponding to a predetermined deactivation period, said signal comprising a preamble including a numbered sequence of microframes and a data frame, the numbering of the microframes of said sequence being such that the number of any of the microframes makes it possible to deduce the remaining number of microframes in the sequence before the data frame, the computer program comprising program instructions for:
reading, on reception of a microframe of a signal, the sequence number of the received microframe,
determining the time of arrival of the data frame of the signal, and
deactivating the device following reception of the microframe and then its reactivation in order to receive said data frame,
wherein a time between a first microframe of said sequence of microframes and a final microframe thereof is greater than or equal to said predetermined deactivation period.

10. A non-transitory computer-readable program medium including a component configured to store the program according to claim 9.

11. A system for transmitting data frames including at least a sender node and a receiver node, wherein the sender node includes a signal-generating device according to claim 6 and the receiver node includes a receiver device for receiving a signal sent via a communications network, said signal comprising a preamble including a numbered sequence of microframes and a data frame, the numbering of the microframes of said sequence being such that the number of any of the microframes makes it possible to deduce the remaining number of microframes in the sequence before the data frame, wherein the receiver device includes a control adapted on reception of a microframe of a signal to read the sequence number of the received microframe, to determine from the read sequence number the time of arrival of the data frame of the signal, and to command deactivation of the receiver device following reception of the microframe and then its reactivation in order to receive said data frame.

* * * * *